No. 819,431. PATENTED MAY 1, 1906.
B. HURD.
MACHINE FOR CUTTING CLOTH ON THE BIAS.
APPLICATION FILED MAR. 25, 1901.
2 SHEETS—SHEET 1.
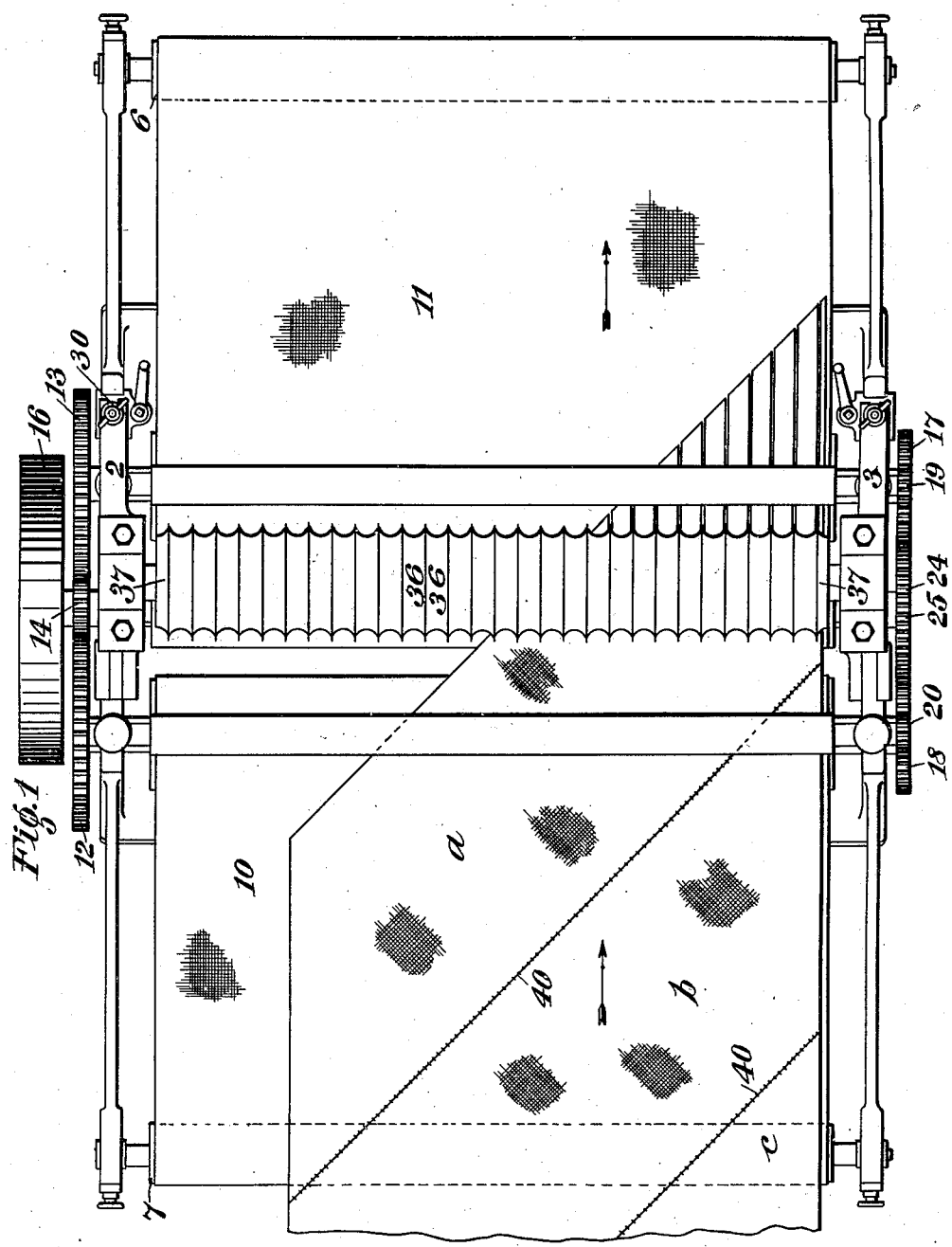
Witnesses
Ralph Jonas,
Henry Best
Benjamin Hurd Inventor
By his Attorney C. W. Edwards No. 819,431. PATENTED MAY 1, 1906.
B. HURD.
MACHINE FOR CUTTING CLOTH ON THE BIAS.
APPLICATION FILED MAR. 25, 1901.
2 SHEETS—SHEET 2.
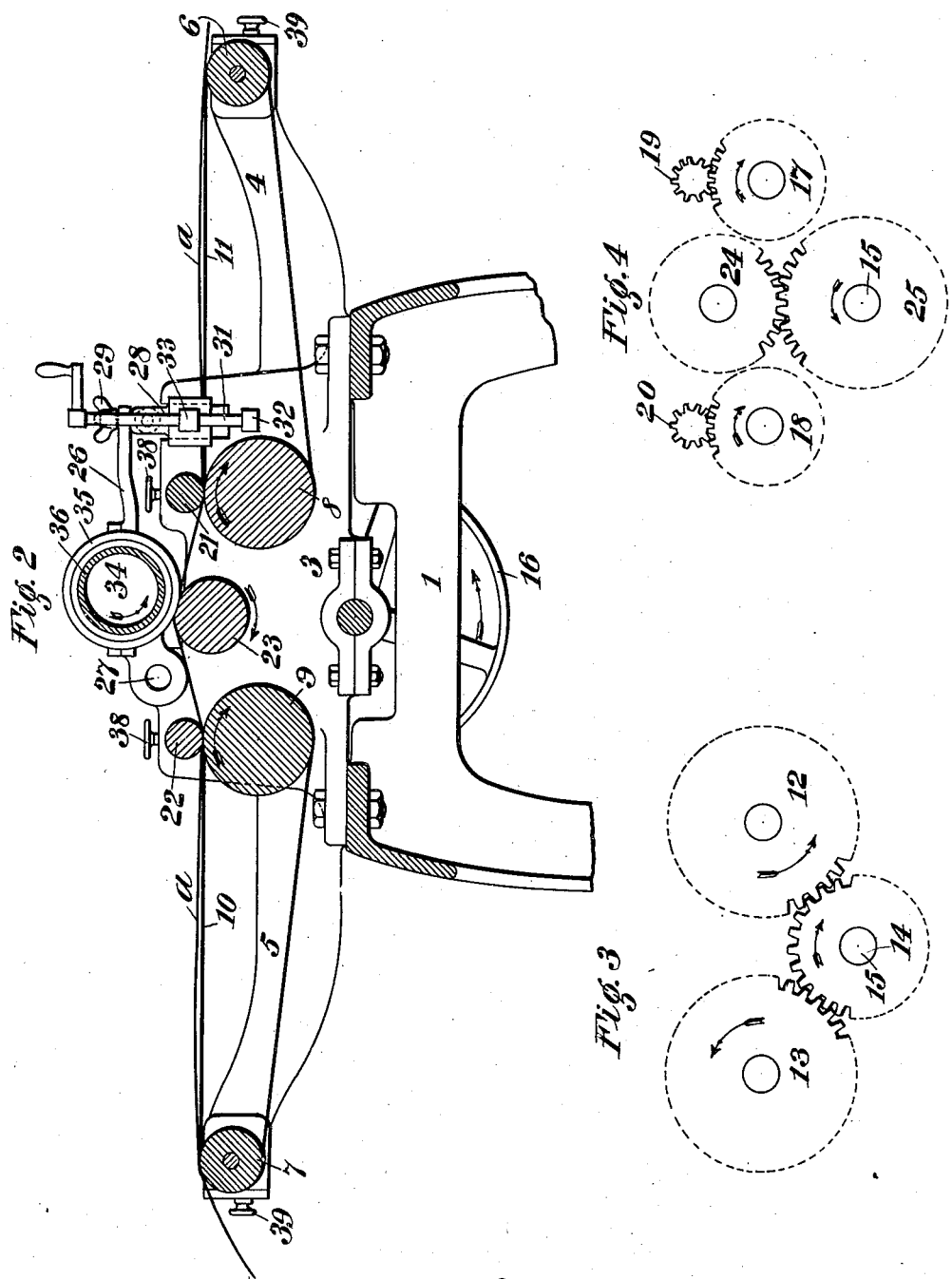
Witnesses
Ralph Jonas.
Henry Pect
Benjamin Hurd Inventor
By his Attorney C. W. Edwards

UNITED STATES PATENT OFFICE.

BENJAMIN HURD, OF NEW YORK, N. Y.

MACHINE FOR CUTTING CLOTH ON THE BIAS.

No. 819,431. Specification of Letters Patent. Patented May 1, 1906.

Application filed March 25, 1901. Serial No. 52,738.

*To all whom it may concern:*

Be it known that I, BENJAMIN HURD, a citizen of the United States, residing at New York, in the county of New York and State of New York, have invented certain new and useful Improvements in a Machine for Cutting Cloth on the Bias, of which the following is a full, clear, and exact specification.

This invention relates to machines for cutting strips of cloth on the bias; and its object is to construct a machine for performing such work automatically and continuously in an efficient manner. Such strips are used for skirt-bindings and the like and heretofore have been cut by hand or by long-bladed knives or shears requiring successive cuts and rearrangement of the cloth by the operators.

According to my invention I propose to feed the cloth in continuous wide strips to a proper number of circular cutting-knives suitably placed apart to cut the desired widths of strips, the web of the cloth being at an angle to the knives, and to provide suitable means for maintaining the proper alinement and tension of the cloth and for preventing the cloth from creeping from one side to the other.

The invention also comprehends other features, which will be referred to hereinafter.

In the accompanying drawings, in which I have illustrated a machine embodying my invention, Figure 1 is a plan view of the machine. Fig. 2 is a sectional side view of the same, and Figs. 3 and 4 are detail views showing the driving-gears on the respective sides of the machine.

Referring more particularly to the drawings, 1 represents a suitable frame upon which are mounted on opposite sides of the machine the side plates 2 and 3. The arms 4 5 extend outward from the opposite ends of the side plates 2 3 and carry suitable bearings for the rollers 6 7. Rollers 8 and 9 are mounted in suitable bearings in the plates 2 and 3, all of said rollers 6, 7, 8, and 9 being parallel to each other. Endless bands 10 and 11 are carried by rollers 6 and 8 and 7 and 9, these bands being preferably of material having a frictional surface, such as felt. Upon the ends of the shafts of rollers 8 and 9 are fixed the gear-wheels 12 and 13, the former having a few more teeth than the latter in order to rotate slower, for a purpose hereinafter referred to. Gear-wheels 12 and 13 both mesh with a gear 14, mounted upon shaft 15, which is journaled in the frame and carries the power-driven pulley 16. Upon the opposite ends of the shafts of rollers 8 and 9 are carried gears 17 and 18, which mesh with gears 19 and 20, carried by the ends of rolls 21 and 22, which are journaled in the side plates and impinge against the rollers 8 and 9 sufficiently tight to engage the cloth to be cut between the rolls and draw the same through the machine. In order that the cloth, which is fed to the rollers with its web at an angle, may not be forced toward one side by the rollers, the rollers 21 and 22 should be covered with felt or other yielding material. The roller 23 of wood or other similar material is suitably journaled in the side plates of the machine and its shaft at one end carries the gear-wheel 24, which meshes with gear-wheel 25 upon the shaft 15. Swinging bearings 26 26 are pivoted to the sides of the machine at 27 27 and arranged to swing into engagement with the blocks 28 28, the latter being provided with pivoted thumbnuts 29, which enter a slot 30 in the end of the bearing, and thus hold the same in engagement with the block.

A screw-threaded rod 31, swiveled in the frame at 32, engages a threaded nut 33 on the block 28, whereby the position of the block (and thus the position of the bearings 26) may be adjusted, and without disturbing the adjustment the bearings may be released and swung back. The shaft 34 is journaled in the bearings 26, and fitted thereon are a plurality of circular knives or disks 35, separated by rings 36, each of approximately the desired width of the strip to be cut. The rings and cutting-disks should, in order to permit of easy adjustment of the machine for cutting various widths of strips, be made removable. This is easily accomplished by alternately slipping the rings and disks on the shaft 34 and clamping the rings and disks against each other by means of the washers 37, screwed upon the opposite ends of the shaft. The bearing of shaft 34 is so adjusted with reference to the position of shaft 23 that that portion of the periphery of the cutting-disks which is to cut the cloth shall impinge against the roller 23 at the point of maximum support of the cloth. This insures that the cloth will at the point of cutting be supported underneath by the roller 23. The arrangement is shown more particularly in Fig. 2. The shaft 34 is rotated by any suitable means, preferably by an independent power, such as an electric motor, direct-connected, belted, or geared to shaft 34 in any well-known manner. The cutting-disks should be rotated at a higher rate of speed than that at which shaft 23 rotates and either in the same direction as that in which shaft 23 rotates or in the opposite direction. The bearings of rollers 21 and 22 are adjusted with respect to rollers 8 and 9 by means of the side screws 38, and the bearings of rollers 6 and 7 are adjusted by means of side screws 39.

In the operation of the machine a continuous web of cloth with bias threads is fitted by sewing together a number of strips *a b c*, as shown in Fig. 1, and this web is laid upon the endless band 10 and the machine started in motion. The cloth is first engaged by the rollers 22 and 9 and drawn farther into the machine thereby. The cloth then passes over the roller 23 and into engagement with the rollers 21 and 8 and after passing through this roller is carried toward the opposite end of the machine by the band 11. The rotating disks 35 cut the cloth at the time it is rising upon the roller 23, and the slightly-faster rotation of rollers 21 and 8, caused by the less number of teeth of gear 13, insures that the cloth will be held in proper tension at the time it is being cut.

The elasticity of the felt covering of the rollers 8, 9, 21, and 22 permits the rollers to be adjusted closely enough together to engage the cloth and carry it through the machine; but at the same time when the seams 40 pass by the rollers that portion of the rollers between which the seams happen to be passing will yield momentarily, and thus prevent the cloth from being pushed to one side, as would be the case if the diagonally-positioned seam engaged unyielding rollers.

It will be understood that the invention herein described is capable of various modifications, and I therefore do not limit myself to the precise construction herein shown.

Having thus described my invention, I declare that what I claim as new, and desire to secure by Letters Patent, is—

1. In a machine of the character described, the combination with the cutting-disk and supporting-roller, of two pairs of yielding-surfaced feeding-rollers one for conveying the web to and the other from the cutting-disk, gear-wheels fixed to the shafts of said feeding-rollers, and a cog meshing with and driving said gear-wheels; the gear-wheel on the roller conveying the web from the cutting-disk having fewer teeth than the other gear-wheel, thereby rotating said roller at a higher rate of speed than the first, substantially as as described.

2. In a machine of the character described, the combination with the cutting-disk and supporting-roller, of two pairs of yielding-surfaced feeding-rollers one for conveying the web to and the other from the cutting-disk, said feeding-rollers being covered with yielding material, and gear-wheels fixed to the shafts of said feeding-rollers, and a cog meshing with and driving said gear-wheels; the gear-wheel on the roller conveying the web from the cutting-disk having fewer teeth than the other gear-wheel, thereby rotating said roller at a higher rate of speed than the first, substantially as described.

3. In a machine of the character described, the combination with two pairs of feeding-rollers, one for conveying a web of uneven thickness to and the other from the cutting-disk, of means for causing said web to adhere to said feeding-rollers while passing therethrough, substantially as described.

4. In a machine of the character described, the combination with two pairs of feeding-rollers, of a supporting-roller intermediate said pairs of feeding-rollers and adapted to raise the web of the cloth between said pairs of rollers, a cutting disk or disks cutting against said supporting-roller and having the cutting edge thereof in contact with the cloth at its maximum point of support, and means for rotating said disk or disks at a different rate of speed from that at which the supporting-roller is rotated, substantially as described.

5. In a machine of the character described, the combination of two pairs of feeding-rollers, said rollers being covered with yielding frictional material, a supporting-roller intermediate said pairs of feeding-rollers and adapted to raise the web of the cloth therebetween, an independently-rotated shaft, a plurality of circular disks and rings alternately spaced on said shaft, the cutting edge of said disks cutting against said supporting-roller at the maximum point of support of the cloth and means for rotating one of said pairs of feeding-rollers at a higher rate of speed than that at which the other is rotated, substantially described.

6. In a machine of the character described, the combination of two pairs of feeding-rollers, said rollers being covered with yielding frictional material, a supporting-roller intermediate said pairs of feeding-rollers and adapted to raise the web of the cloth therebetween, an independently-rotated shaft, a plurality of circular disks and rings alternately spaced on said shaft, the cutting edge of said disks cutting against said supporting-roller at the maximum point of support of the cloth and means for adjusting the relative positions of said feeding-disks and supporting-roller with respect to each other, substantially as described.

7. In a machine of the character described, the combination with the cutting-disks, of two pairs of rollers, one pair adapted to convey a web to the cutting-disks and present the same thereto at an angle to the web, the other pair adapted to convey the web from said cutting-disks, and yielding means for preventing said web from puckering or creeping when being cut, substantially as described.

8. In a machine of the character described, the combination with the cutting-disks, of feeding-rollers adapted to deliver a web of cloth to the cutting-disks and present the same thereto at an angle to the web, and yielding means for preventing sidewise creeping of said web, substantially as described.

9. In a machine of the character described, the combination of a shaft carrying a plurality of spaced cutting-disks, feed-rollers adapted to deliver a web of cloth to said cutting-disks at an angle to the web, yielding means for preventing sidewise creeping of said web, and means for removing the web from the cutting-disks, substantially as described.

10. In a machine of the character described, the combination with the cutting-disks, of two pairs of rollers adapted to feed webs of varying thickness diagonally, cutters in the rear of said rollers adapted to cut strips from said web on the bias, and means for smoothing the web, substantially as described.

11. In a machine of the character described, the combination of a shaft carrying a plurality of spaced cutting-disks, two sets of feed-rollers on opposite sides thereof adapted to feed a web of varying thickness at an angle to the cutters, and means causing the web to adhere to the feed-rolls at all points as it passes through, substantially as described.

In testimony whereof I affix my signature in presence of two witnesses.

BENJAMIN HURD.

Witnesses:
H. STANTON HURD,
C. V. EDWARDS.